(12) United States Patent
Lobo et al.

(10) Patent No.: US 10,404,108 B2
(45) Date of Patent: Sep. 3, 2019

(54) SYSTEM AND METHODS OF ELECTRIC MACHINE ROTOR POSITION DETECTION

(71) Applicant: Regal Beloit America, Inc., Beloit, WI (US)

(72) Inventors: Nimal Savio Lobo, Blacksburg, VA (US); Hyongyeol Yang, Franksville, WI (US); Krishnan Ramu, Blacksburg, VA (US); Daniel W. Huff, Blacksburg, VA (US); John L. Lewis, Madison Heights, VA (US)

(73) Assignee: Regal Beloit America, Inc., Beloit, WI (US)

( * ) Notice: Subject to any disclaimer, the term of this patent is extended or adjusted under 35 U.S.C. 154(b) by 851 days.

(21) Appl. No.: 14/310,847

(22) Filed: Jun. 20, 2014

(65) Prior Publication Data
US 2015/0372543 A1  Dec. 24, 2015

(51) Int. Cl.
*H02K 1/14* (2006.01)
*H02K 1/24* (2006.01)
(Continued)

(52) U.S. Cl.
CPC ............. *H02K 1/14* (2013.01); *H02K 1/246* (2013.01); *H02K 11/22* (2016.01); *H02K 19/103* (2013.01);
(Continued)

(58) Field of Classification Search
CPC ............ H02K 1/22; H02K 1/24; H02K 1/246; H02K 11/21; H02K 11/215; H02K 11/22; H02K 11/225; H02K 19/06
(Continued)

(56) References Cited

U.S. PATENT DOCUMENTS

| 713,604 | A | * | 11/1902 | Churchward | .......... | H02K 1/148 |
| | | | | | | 310/216.077 |
| 2,054,678 | A | * | 9/1936 | Merrill | ................... | H02K 47/04 |
| | | | | | | 310/112 |

(Continued)

FOREIGN PATENT DOCUMENTS

| WO | WO-8606891 A1 | * 11/1986 | ............. H02K 1/246 |
| WO | 2012167316 A1 | 12/2012 | |

OTHER PUBLICATIONS

International Search Report and Written Opinion of International Application No. PCT/US15/36599, dated Sep. 30, 2015, 13 pages.

*Primary Examiner* — Thomas Truong
(74) *Attorney, Agent, or Firm* — Armstrong Teasdale LLP

(57) ABSTRACT

An electric machine includes a stator assembly defining a longitudinal axis. The stator assembly includes a substantially cylindrical stator core that is concentric with and extends longitudinally along the longitudinal axis. The stator core includes a stator pole having an inner surface spaced radially outward from the longitudinal axis. The stator pole includes a first aperture extending radially outward from the inner surface of the stator pole. The electric machine also includes a rotor assembly rotatable about the longitudinal axis. The rotor assembly includes a rotatable shaft and a rotor core. The rotor core is concentric with and extends longitudinally along the longitudinal axis. The rotor core also includes a rotor pole including an outer surface spaced radially outward from the longitudinal axis. The outer surface is spaced radially inward from the stator pole inner surface.

10 Claims, 12 Drawing Sheets

(51) Int. Cl.
  *H02K 29/06* (2006.01)
  *H02K 19/10* (2006.01)
  *H02K 11/22* (2016.01)
  *H02K 19/24* (2006.01)
  *H02K 29/08* (2006.01)
  *H02K 29/10* (2006.01)

(52) U.S. Cl.
  CPC ............. *H02K 19/24* (2013.01); *H02K 29/08* (2013.01); *H02K 29/10* (2013.01); *H02K 2213/03* (2013.01); *Y10T 29/49011* (2015.01)

(58) Field of Classification Search
  USPC ................................. 310/68 B, 216.075, 168
  See application file for complete search history.

(56) References Cited

U.S. PATENT DOCUMENTS

| | | | |
|---|---|---|---|
| 3,604,961 A * | 9/1971 | Saldinger | H02K 23/405 310/154.29 |
| 4,166,966 A | 9/1979 | Issler et al. | |
| 4,280,072 A | 7/1981 | Gotou et al. | |
| 4,516,048 A | 5/1985 | Brigham | |
| 4,748,362 A * | 5/1988 | Hedlund | H02K 1/246 310/162 |
| 5,111,096 A | 5/1992 | Horst | |
| 5,239,217 A | 8/1993 | Horst | |
| 5,256,923 A * | 10/1993 | Bartos | H02K 29/14 310/106 |
| 5,294,856 A | 3/1994 | Horst | |
| 5,331,245 A | 7/1994 | Burgbacher et al. | |
| 5,604,388 A | 2/1997 | Baker et al. | |
| 5,668,430 A * | 9/1997 | Kolomeitsev | H02K 16/00 310/114 |
| 5,866,962 A | 2/1999 | Kim | |
| 6,147,428 A | 11/2000 | Takezawa et al. | |
| 6,198,194 B1 * | 3/2001 | Vyas | H02K 19/103 29/598 |
| 6,483,212 B1 * | 11/2002 | Mimura | H02K 1/246 310/168 |
| 6,744,171 B1 | 6/2004 | Kolomeitsev | |
| 7,948,145 B2 | 5/2011 | Nakayama et al. | |
| 2001/0048264 A1 | 12/2001 | Trago et al. | |
| 2003/0025408 A1 | 2/2003 | Miekka et al. | |
| 2003/0107278 A1 | 6/2003 | Agnes et al. | |

* cited by examiner

SYSTEM AND METHODS OF ELECTRIC MACHINE ROTOR POSITION DETECTION

BACKGROUND

The field of the disclosure relates generally to electric machines, and more specifically, to detecting the rotor position in switched reluctance machines.

Generally, switched reluctance machines have poles or teeth on both the stator and the rotor. There is a concentrated winding on each of the stator poles, but no windings or permanent magnets on the rotor. Each pair of diametrically opposite stator windings is connected in series or in parallel to form one phase of the switched reluctance motor. Some known switched reluctance machines have more than one phase, e.g., a four pole or six pole switched reluctance machine may have two or three phases, respectively.

In some known switched reluctance machines, such as switched reluctance motors, a controller is generally used to switch current on in each phase in a predetermined sequence to generate a magnetic attraction force between rotor and stator poles that are approaching each other. The controller switches the current off in each phase before the rotor poles nearest the stator poles of that phase rotate past a generally aligned position. This sequential switching on and off of current in the different phases of the switched reluctance motor is responsible for generating the motor torque. If the current is not switched off before the aligned position of the rotor and stator poles in a respective phase, the magnetic attraction force will produce a braking torque in the switched reluctance motor.

Further, in some known switched reluctance motors, the rotor poles are symmetrical with respect to a set of stator poles, resulting in rotor positions where the torque generated by the switching on and off of current in the different phases of the switched reluctance motor is zero. These rotor positions of zero torque make it difficult to start the switched reluctance motor if the stand-still or start-up rotor position corresponds to them. Moreover, in some known switched reluctance motors, because the initial rotor position is not known, the rotor is aligned with the stator by energizing one phase of the motor. This enables the rotor to be placed in a known position to facilitate start-up. However, in some known applications of switched reluctance motors, the motor cannot rotate in a reverse direction to align the rotor poles with the stator.

Generally, for switched reluctance motors to function properly, the current to the phases must be switched on and off in precise synchronism with the rotor position. In some known switched reluctance motors, switching the current on and off based on the rotor position is accomplished using a shaft position sensor. Some known shaft position sensors include Hall effect sensors, which include a transducer that varies its output voltage in response to a magnetic field. However, a disadvantage of using Hall effect sensors is that the elements of the sensor must be very precisely fixed to get an accurate reading of the rotor position. Furthermore, such shaft position sensors are undesirable in small motors because of cost, and in both large and small motors because of space requirements and the vulnerability of the signal wires that must run between the motor and the electronic power converter. In addition, incorporating such position sensors in switched reluctance motors increases the size, cost, and complexity of the motors.

BRIEF DESCRIPTION

In one aspect, an electric machine is provided. The electric machine includes a stator assembly defining a longitudinal axis. The stator assembly includes a substantially cylindrical stator core that is concentric with and extends longitudinally along the longitudinal axis. The stator core also includes a stator pole. The stator pole includes an inner surface spaced radially outward from the longitudinal axis. The stator pole includes a first aperture extending radially outward from the inner surface of the stator pole. Furthermore, the electric machine includes a rotor assembly rotatable about the longitudinal axis. The rotor assembly includes a rotatable shaft and a rotor core. The rotor core is concentric with and extends longitudinally along the longitudinal axis. The rotor core also includes a rotor pole. The rotor pole includes an outer surface spaced radially outward from the longitudinal axis. The outer surface is spaced radially inward from the stator pole inner surface.

In another aspect, a method of assembling an electric machine is provided. The method includes providing a substantially cylindrical motor assembly housing. The motor assembly housing defines a central longitudinal axis. Further, the method includes coupling a stator assembly within the motor assembly housing, the stator assembly including a substantially cylindrical stator core concentric with and extending longitudinally along the central longitudinal axis and including a stator pole. The stator pole includes an inner surface. Moreover, the method includes forming a first aperture in the stator pole. The first aperture extends radially outward from the inner surface of the stator pole. In addition, the method includes rotatably coupling a rotor assembly to the motor assembly housing. The rotor assembly includes a rotatable shaft and a rotor core. The rotor core is concentric with and extends longitudinally along the central longitudinal axis and includes a rotor pole. The rotor pole includes an outer surface.

In yet another aspect, an electric machine is provided and includes a substantially cylindrical motor assembly housing having an end plate. The motor assembly housing defines a central longitudinal axis. A stator assembly is coupled within the motor assembly housing. The stator assembly includes a plurality of stator poles, each one of the plurality of stator poles has a substantially equal predetermined first width. A rotor assembly is rotatable about the central longitudinal axis. The rotor assembly includes a rotatable shaft and a rotor core. The rotor core includes a plurality of rotor poles. Furthermore, the electric machine includes an optical sensing system including a substantially cylindrical encoder device defining an axis of rotation. The encoder device includes a plurality of encoder teeth extending axially along the axis of rotation. Each one of the plurality of encoder teeth has a substantially equal predetermined second width. The encoder device also includes a plurality of rotor teeth extending axially along the axis of rotation in a direction opposite the plurality of encoder teeth. Further, the optical sensing system includes an optical sensor configured to generate an optical signal and sense the generated optical signal. In addition, the optical sensing system includes a sensor mount configured to couple to the end plate and the optical sensor.

Although specific features of various embodiments may be shown in some drawings and not in others, this is for convenience only. Any feature of any drawing may be referenced and/or claimed in combination with any feature of any other drawing.

DETAILED DESCRIPTION

Figure 1:
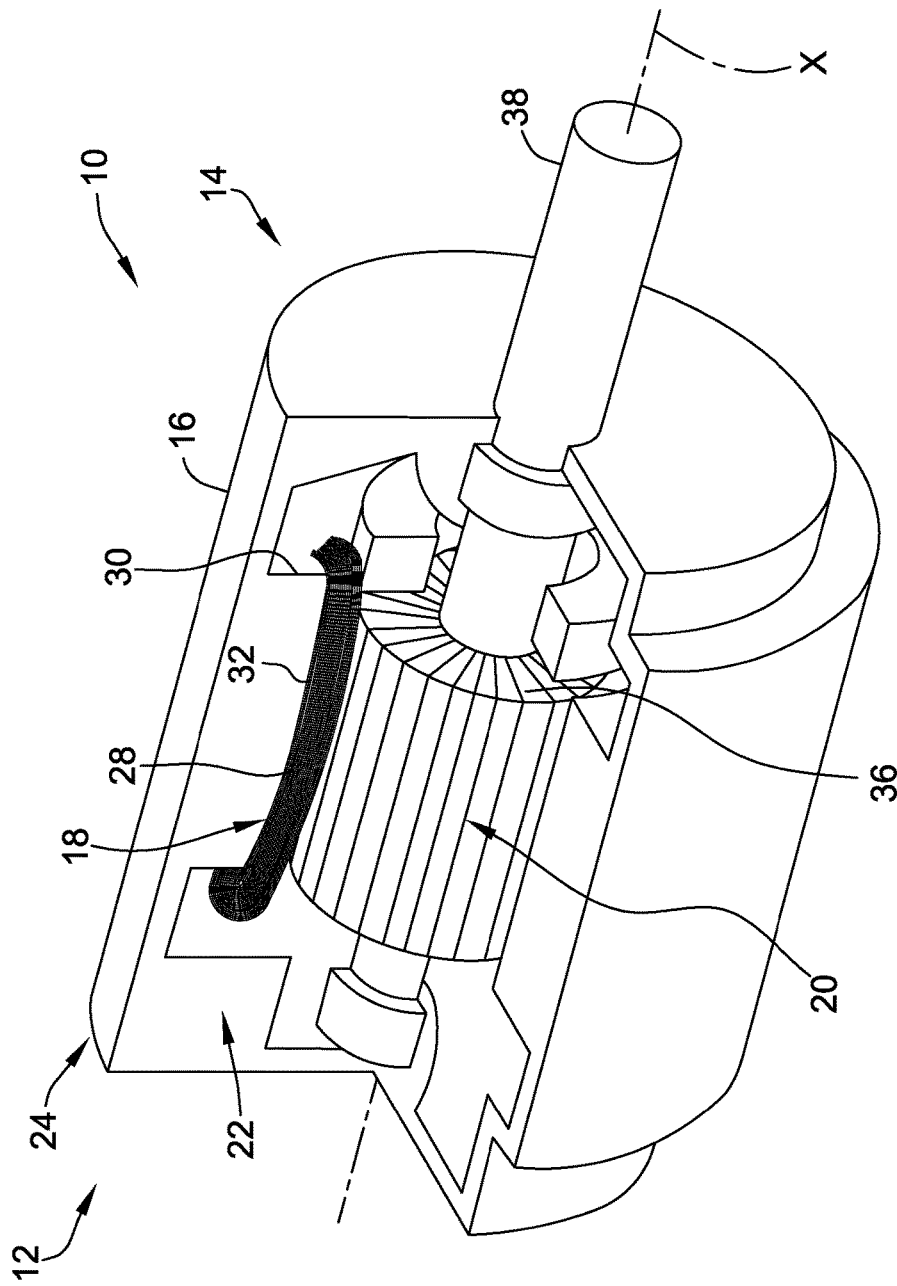
FIG. 1 is a schematic end view of a switched reluctance machine ("SRM")

FIG. 1 is a schematic end view of a switched reluctance machine ("SRM") 10. In the exemplary embodiment, SRM 10 is a switched reluctance motor, although, SRM 10 may function as either a switched reluctance motor or a switched reluctance generator. SRM 10 includes a first end 12, a second end 14, and a substantially cylindrical motor assembly housing 16. SRM 10 also includes a stator assembly generally indicated at 18, and a rotor assembly generally indicated at 20. Motor assembly housing 16 defines an interior space 22 and an exterior 24 of SRM 10 and is configured to at least partially enclose and protect stator assembly 18 and rotor assembly 20. Stator assembly 18 includes a substantially cylindrical stator core 28 having a plurality of stator poles 30, and a plurality of windings 32. Each stator pole 30 includes a winding 32 wound around the pole.

In the exemplary embodiment, stator core 28 is a four pole stator structure. Alternatively, stator core 28 may include any number of poles that enables SRM 10 to function as described herein, for example, without limitation, stator core 28 may have six or eight poles. Furthermore, in an exemplary embodiment, stator assembly 18 is a two-phase salient pole stator assembly and stator core 28 is formed from a stack of laminations made of magnetically permeable material. Alternatively, stator assembly 18 may have any number of phases that enable stator assembly 18 to function as described herein. Stator assembly 18 may be a round, a segmented, or a roll-up type stator construction and windings 32 may be wound on stator core 28 in any suitable manner that enables SRM 10 to function as described herein. For example, without limitation, windings 32 may be concentrated type or overlapped type windings.

In the exemplary embodiment, rotor assembly 20 is a six pole rotor structure. Alternatively, rotor assembly 20 may include any number of poles that enables SRM 10 to function as described herein, for example, without limitation, rotor assembly 20 may have eight or ten poles. Furthermore, rotor assembly 20 includes a substantially cylindrical rotor core 36 and a rotor shaft 38. In the exemplary embodiment, rotor core 36 is formed from a stack of laminations made of magnetically permeable material. Alternatively, rotor core 36 is a solid core. Rotor core 36 is substantially received in a central bore of stator core 28 for rotation along an axis of rotation X. For simplicity, rotor core 36 and stator core 28 are shown in FIG. 1 as solid. While FIG. 1 is an illustration of a two phase SRM, the methods and apparatus described herein may be included within motors having any number of phases, including single phase and multiple phase motors.

Figure 2:
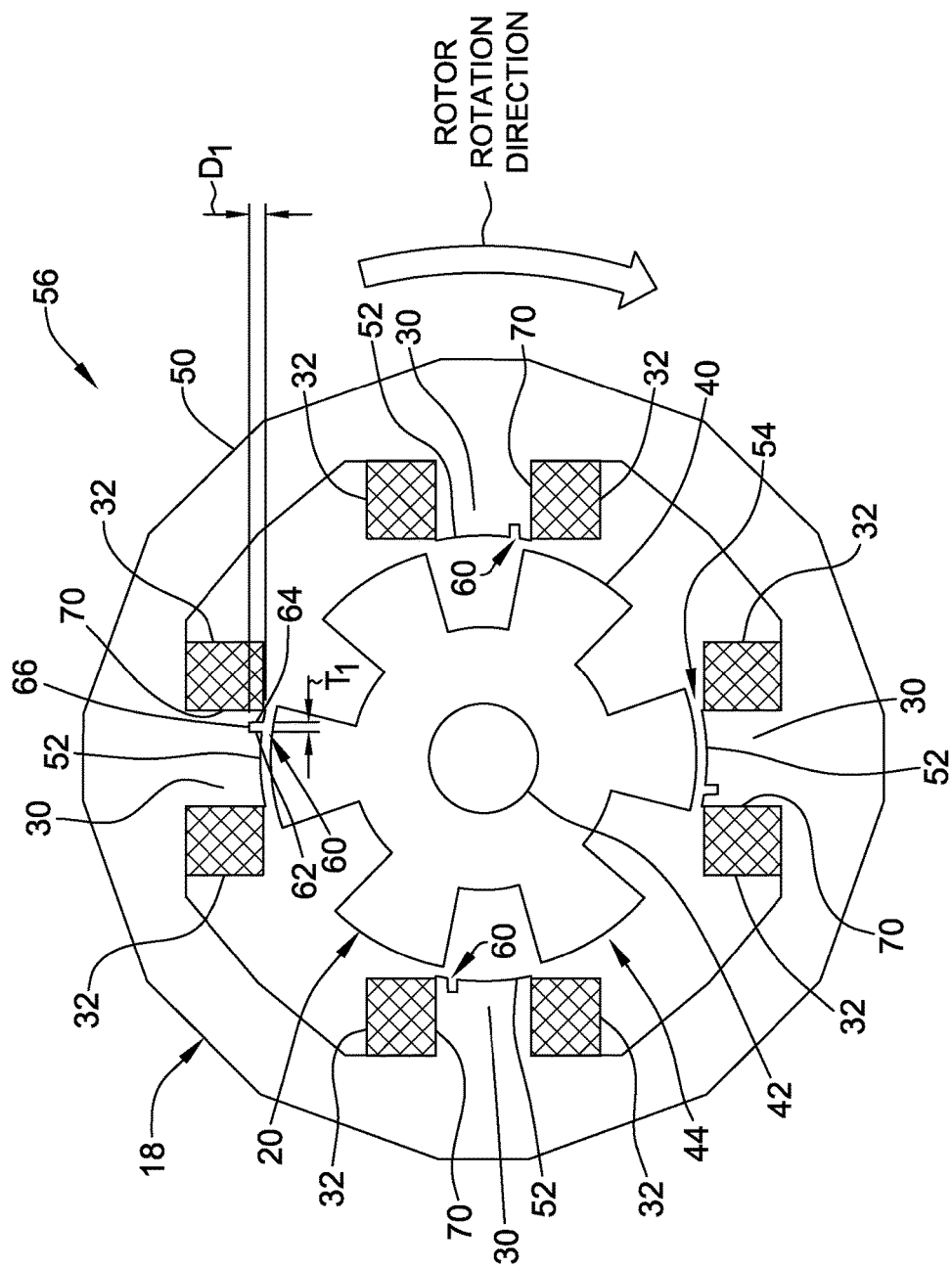
FIG. 2 is a schematic end view of an exemplary embodiment of a rotor core and a stator core that may be used with the SRM shown in FIG. 1.

FIG. 2 is a schematic end view of an exemplary embodiment of rotor core 36 and stator core 28 that may be included within SRM 10 (shown in FIG. 1). Rotor core 36 is substantially cylindrical and includes an outer edge 40 and a shaft central opening or inner edge 42 having a diameter corresponding to the diameter of shaft 38 (shown in FIG. 1). Rotor core 36 and shaft 38 are concentric and are configured to rotate about axis of rotation X (shown in FIG. 1). In the exemplary embodiment, rotor core 36 includes a plurality of substantially identical rotor laminations 44. For example, without limitation, laminations 44 are fabricated from multiple punched layers of stamped metal such as steel. In an alternative embodiment, rotor core 36 is a solid core. A solid core may be a complete, one-piece component, or may include multiple non-laminated sections coupled together to form a complete solid core. In one embodiment, a solid rotor core is fabricated from a magnetic material, such as, for example, a Soft Magnetic Alloy (SMA) or a Soft Magnetic Composite (SMC) material. In alternative embodiments, rotor core 36 is fabricated from any ferromagnetic material that enables SRM 10 to function as described herein, such as, for example, steel.

In the exemplary embodiment, stator core 28 is substantially cylindrical and includes an outer edge 50 and a central opening or inner edge 52 having a diameter slightly larger than outer edge 40 of rotor core 36. Inner edge 52 defines the innermost edge of each stator pole 30. Rotor core 36 is positioned relative to stator core 28, each concentric about axis of rotation X (shown in FIG. 1). An air gap 54 is defined between outer edge 40 of rotor core 36 and inner edge 52 of stator core 28. Air gap 54 enables free rotation of rotor core 36 within stator core 28. In the exemplary embodiment, stator core 28 includes a plurality of substantially identical stator laminations 56. For example, without limitation, laminations 56 are fabricated from multiple punched layers of stamped metal such as steel. In an alternative embodiment, stator core 28 is a solid core. A solid core may be a complete, one-piece component, or may include multiple non-laminated sections coupled together to form a complete solid core. In one embodiment, a solid stator core is fabricated from a magnetic material, such as, for example, a Soft Magnetic Alloy (SMA) or a Soft Magnetic Composite (SMC) material. In alternative embodiments, stator core 28 is fabricated from any ferromagnetic material that enables SRM 10 to function as described herein, such as, for example, steel.

Figure 11:
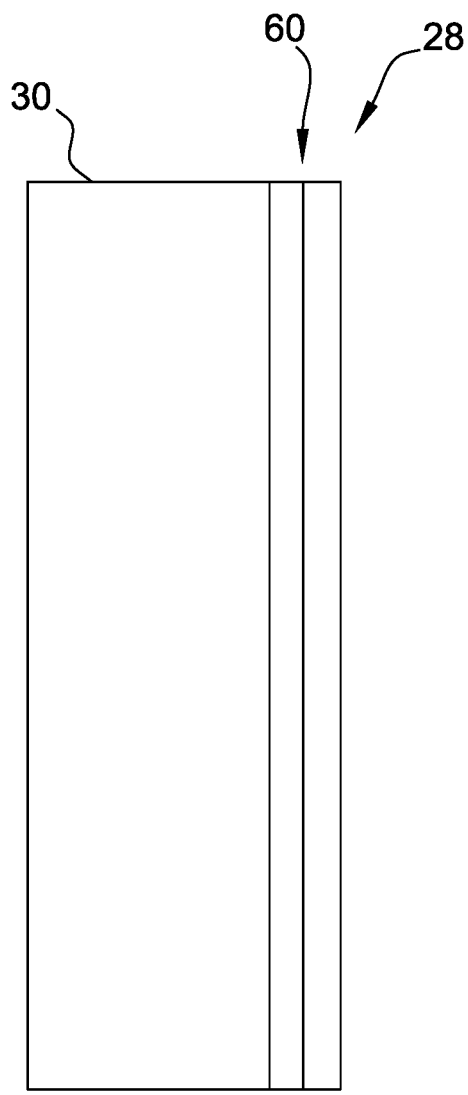
FIG. 11 is a schematic elevation view of a stator pole of the stator core shown in FIG. 2.

In the exemplary embodiment, stator core 28 includes a plurality of radial apertures 60 extending substantially radially outward from inner edge 52, wherein each stator pole 30 includes a single aperture 60. For example, each radial aperture 60 includes a first wall 62, a second wall 64, and a third wall 66. Each radial aperture 60 includes a depth D1 and a thickness T1, and extends axially along a predetermined length of stator core 28, between first end 12 (shown in FIG. 1) to second end 14 (also shown in FIG. 1). For example, without limitation, depth D1 and thickness T1 can have any dimension that enables SRM 10 to function as described herein. Furthermore, each radial aperture 60 may extend the entire length of stator core 28 as shown in FIGS. 2 and 11, or just a partial length of stator core 28, beginning and ending at any predetermined point along stator core 28 that enables SRM 10 to function as described herein. In the exemplary embodiment, aperture 60 is shown having a rectangular cross section, however, aperture 60 may have any cross sectional shape that enables SRM 10 to function as described herein, for example, without limitation, curved, polygonal, and the like.

In the exemplary embodiment, aperture 60 is circumferentially or angularly offset from a radial line centered on stator pole 30 toward a trailing edge 70 of stator pole 30. This provides a detection signal (not shown in FIG. 2) during the negative slope portion of an inductance curve associated with SRM 10, to be further described below. It should be noted that each aperture 60 is positioned in substantially the same position on each respective stator pole 30. In other suitable embodiments, aperture 60 is located anywhere on stator pole 30 that enables SRM 10 to function as described herein.

Figure 3:
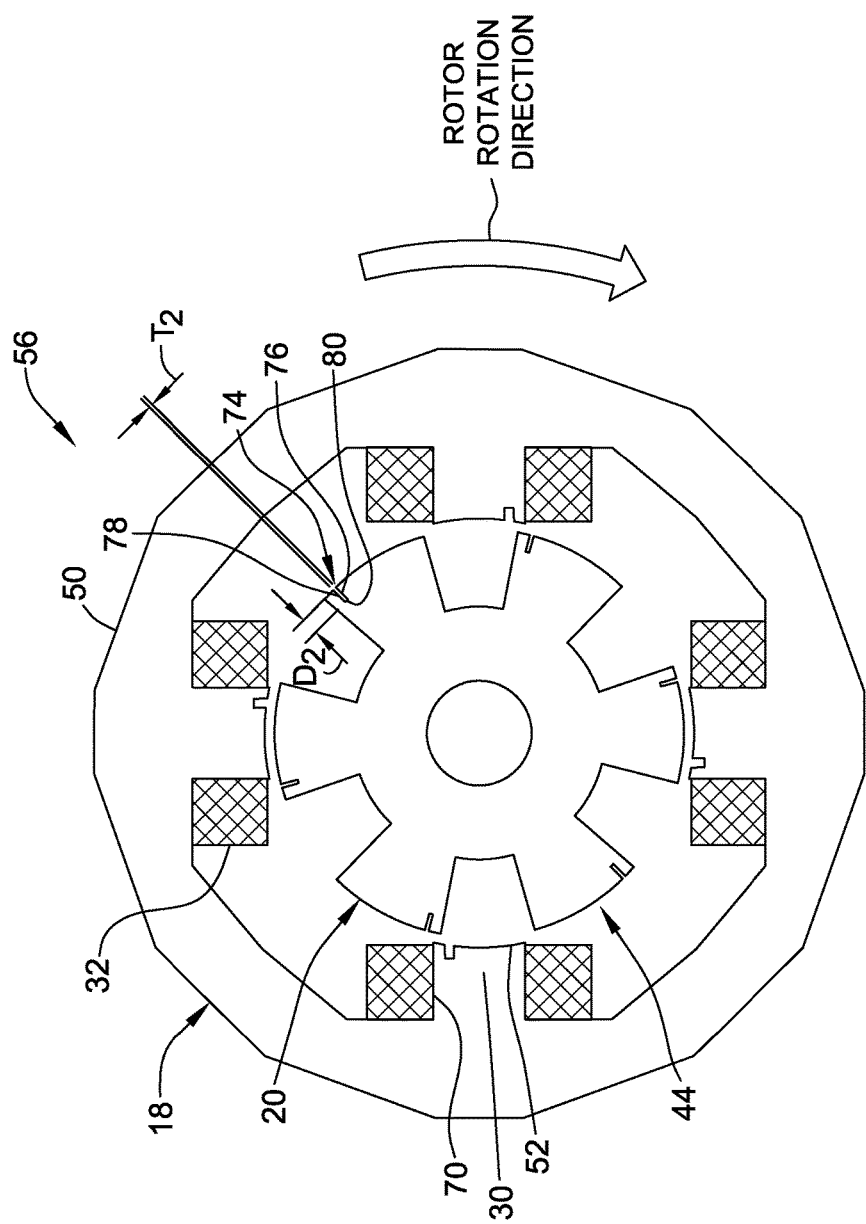
FIG. 3 is a schematic end view of an alternative embodiment of a rotor core and a stator core that may be used with the SRM shown in FIG. 1.
Figure 12:
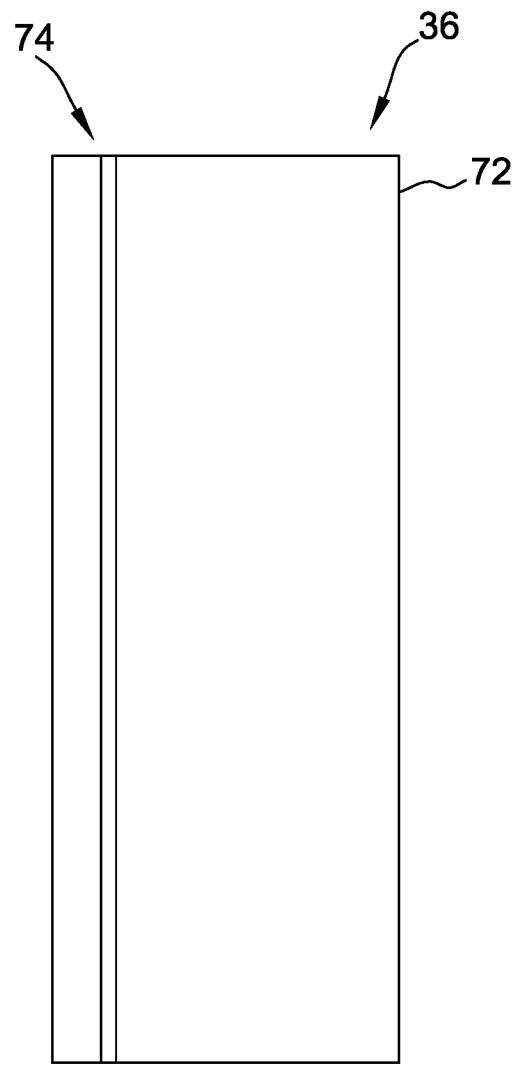
FIG. 12 is a schematic elevation view of a rotor pole of the rotor core shown in FIG. 3.

FIG. 3 is a schematic end view of an alternative embodiment of rotor core 36 and stator core 28 that may be included within SRM 10 (shown in FIG. 1). This embodiment includes the features discussed above with respect to FIG. 2 plus the additional feature to be described below. As seen in FIG. 3, rotor core 36 includes a plurality of rotor poles 72, each extending outward to outer edge 40. Furthermore, rotor core 36 includes a plurality of radial apertures 74 extending substantially radially inward from outer edge 40, wherein each rotor pole 72 includes a single aperture 74. In the exemplary embodiment, each radial aperture 74 includes a first wall 76, a second wall 78, and a third wall 80. Each radial aperture 74 includes a depth D2 and a thickness T2, and extends axially along a predetermined length of rotor core 36, between first end 12 (shown in FIG. 1) and second end 14 (also shown in FIG. 1). For example, without limitation, depth D2 and thickness T2 can have any dimension that enables SRM 10 to function as described herein. Furthermore, each radial aperture 74 may extend the entire length of rotor core 36 as shown in FIGS. 3 and 12, or just a partial length of rotor core 36, beginning and ending at any predetermined point along rotor core 36 that enables SRM 10 to function as described herein. In one suitable embodiment, each radial aperture 74 extends along a predetermined length of rotor core 36 opposite aperture 60 of stator core 28. Alternatively, aperture 74 extends along any portion of rotor core 36, irrespective of aperture 60 of stator core 28 that enables SRM 10 to function as described herein. In the exemplary embodiment, aperture 74 is shown having a rectangular cross section, however, aperture 74 may have any cross sectional shape that enables SRM 10 to function as described herein, for example, without limitation, curved, polygonal, and the like. It is contemplated that aperture 60 may be omitted from SRM 10, and that only apertures 74 may be included.

In the exemplary embodiment, aperture 74 is circumferentially or angularly offset from a radial line centered on rotor pole 72 toward a trailing edge 82 of rotor pole 72. This provides a detection signal (not shown in FIG. 3) during the negative slope portion of an inductance curve associated with SRM 10, to be further described below. It should be noted that each aperture 74 is positioned in substantially the same position on each respective rotor pole 72. In other suitable embodiments, aperture 74 can be located anywhere on rotor pole 72 that enables SRM 10 to function as described herein.

Figure 4:
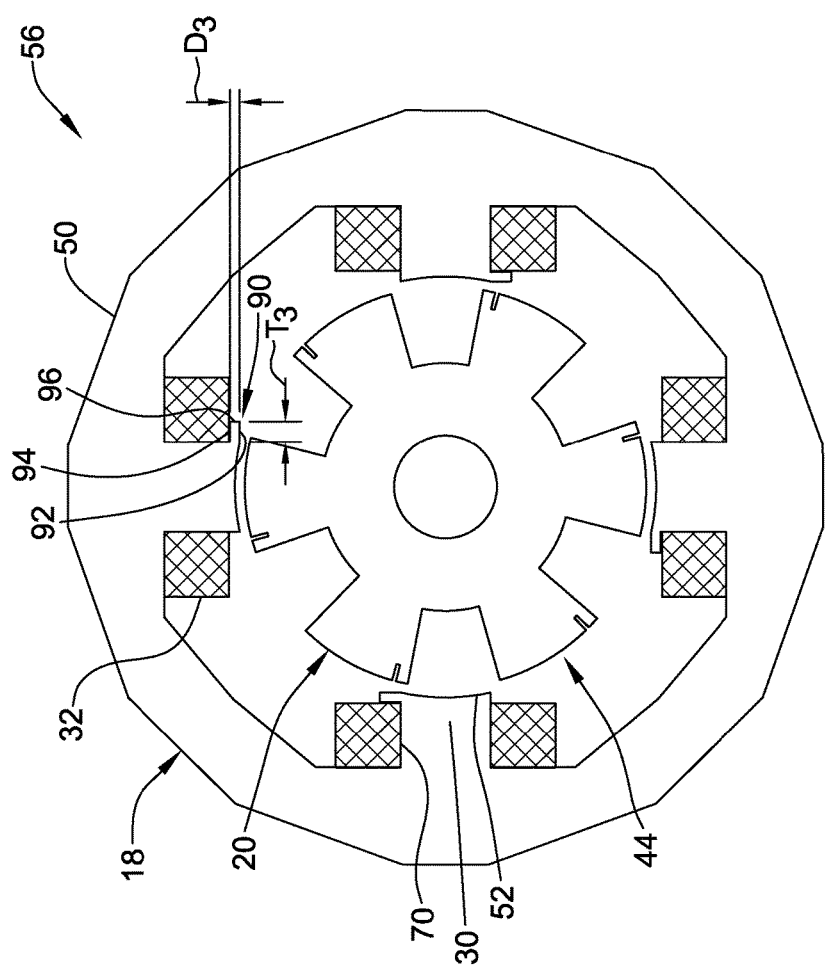
FIG. 4 is a schematic end view of yet another alternative embodiment of a rotor core and a stator core that may be used with the SRM shown in FIG. 1.

FIG. 4 is a schematic end view of yet another alternative embodiment of rotor core 36 and stator core 28 that may be included within SRM 10 (shown in FIG. 1). This embodiment includes the same rotor features discussed above with respect to FIG. 3; however apertures 60 are omitted from stator core 28. As seen in FIG. 4, stator core 28 includes a plurality of pole extensions 90 extending substantially circumferentially from trailing edges 70 of stator poles 30, wherein each stator pole 30 includes a single extension 90. In the exemplary embodiment, each extension 90 includes a first wall 92, a second wall 94, and a third wall 96. Each extension 90 includes a depth D3 and a thickness T3. In addition, extension 90 extends axially along a predetermined length of stator core 28, between first end 12 (shown in FIG. 1) and second end 14 (also shown in FIG. 1). For example, without limitation, depth D3 and thickness T3 can have any dimension that enables SRM 10 to function as described herein. Furthermore, each extension 90 may extend the entire axial length of stator core 28, or just a partial axial length of stator core 28, beginning and ending at any predetermined point along stator core 28 that enables SRM 10 to function as described herein. In one suitable embodiment, each extension 90 extends along a predetermined axial length of stator core 28 substantially opposite aperture 74 of rotor core 36. Alternatively, extension 90 can extend axially along any portion of stator core 28, irrespective of aperture 74 of rotor core 36 that enables SRM 10 to function as described herein. In the exemplary embodiment, extension 90 is shown having a rectangular cross section, however, extension 90 may have any cross sectional shape that enables SRM 10 to function as described herein, for example, without limitation, curved, polygonal, and the like.

In operation, a motor controller (not shown) is used to supply current to windings 32 in a conventional manner, wherein each phase of SRM 10 is energized in a sequential manner to generate a rotating magnetic field within SRM 10. Rotor assembly 20 is thus induced to follow the rotating magnetic field and generate a torque output of SRM 10. As rotor assembly 20 nears and/or passes the commutation point for a respective phase, the next phase is energized to continually generate a moving magnetic field, and thereby continuing rotating rotor assembly 20. In order to operate SRM 10 properly and in an efficient manner, the motor controller sequentially activates each phase of SRM 10 based on a rotor assembly position obtained from the structure and methods described herein.

Figure 5:
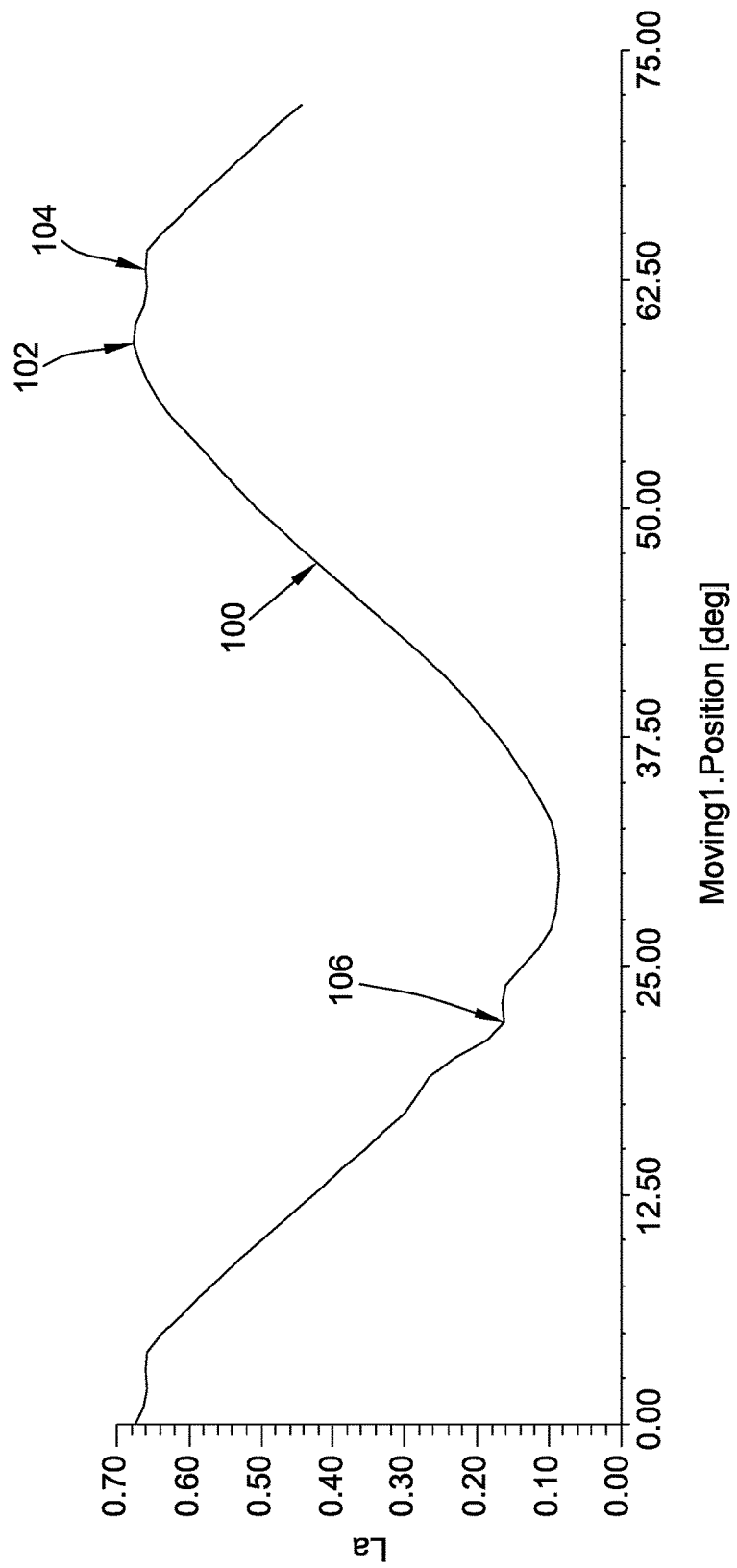
FIG. 5 is a graph illustrating rotor position versus inductance for the SRM shown in FIG. 1.

FIG. 5 is a graph illustrating rotor position versus inductance for SRM 10 (shown in FIG. 1). Referring to FIGS. 2-5, in operation, a current is applied to a respective winding 32 (shown in FIGS. 2-4) of a respective stator pole 30 (shown in FIGS. 2-4), thereby attracting one of rotor poles 72 (shown in FIGS. 2-4). As the respective rotor pole 72 nears stator pole 30, the magnetic flux increases, which increases inductance, shown as the positive slope portion generally indicated at 100. In the exemplary embodiment, positive slope portion 100 is generally smooth and free from irregularities indicating a substantially smooth application of torque in SRM 10. As rotor pole 72 nears the commutation point, i.e. being approximately centered on stator pole 30, the current is removed from winding 32, thereby enabling rotor pole 72 to rotate or coast past stator pole 30. This portion of the inductance curve is generally indicated in FIG. 5 at 102 and equals the maximum inductance of SRM 10. However, depending on the specific embodiment of SRM 10, one or more of aperture 60, aperture 74, and extension 90 cause a small irregularity in the inductance curve proximate the maximum inductance point, generally indicated at 104. As rotor pole 72 continues to rotate past stator pole 30, again, depending on the specific embodiment of SRM 10—one or more of aperture 60, aperture 74, and extension 90 cause a more pronounced irregularity in the negative slope of the inductance curve of SRM 10, generally indicated at 106 in FIG. 5. This is particularly true in the embodiment disclosed by FIG. 3 where aperture 60 and aperture 74 become aligned, thereby producing a larger irregularity 106. This more pronounced irregularity 106 in the inductance curve can be detected by a motor controller (not shown) and can be equated to a position of rotor assembly 20 and a direction of rotation of rotor assembly 20.

An exemplary method of manufacturing SRM 10 is provided herein. Motor assembly housing 16 is provided with stator assembly 18 coupled within. Stator assembly 18 includes stator core 28, which is formed with a plurality of stator poles 30. Each of stator poles 30 is wrapped with a winding 32. In the exemplary embodiment, stator core 28 is fabricated from a plurality of substantially identical laminations 56, each having an aperture 60 defined therethrough. Alternatively, stator core 60 may be fabricated as a solid core stator having apertures 60 formed as longitudinal grooves extending substantially axially along stator core 28. Each aperture 60 is formed on a trailing portion of each respective stator pole 30. In the exemplary embodiment, motor assembly housing 16 is provided with rotor assembly 20, which includes rotor core 36. Rotor core 36 includes a plurality of rotor poles 72, and is positioned coaxial relative to stator core 28. In one suitable embodiment, rotor core 36 is fabricated from a plurality of substantially identical laminations 44, each having a plurality of apertures 74 defined therethrough. Each aperture 74 is formed on a trailing edge portion of each respective rotor pole. Alternatively, rotor core 36 is fabricated as a solid core rotor having apertures 74 formed as longitudinal grooves substantially axially along rotor core 36.

Figure 6:
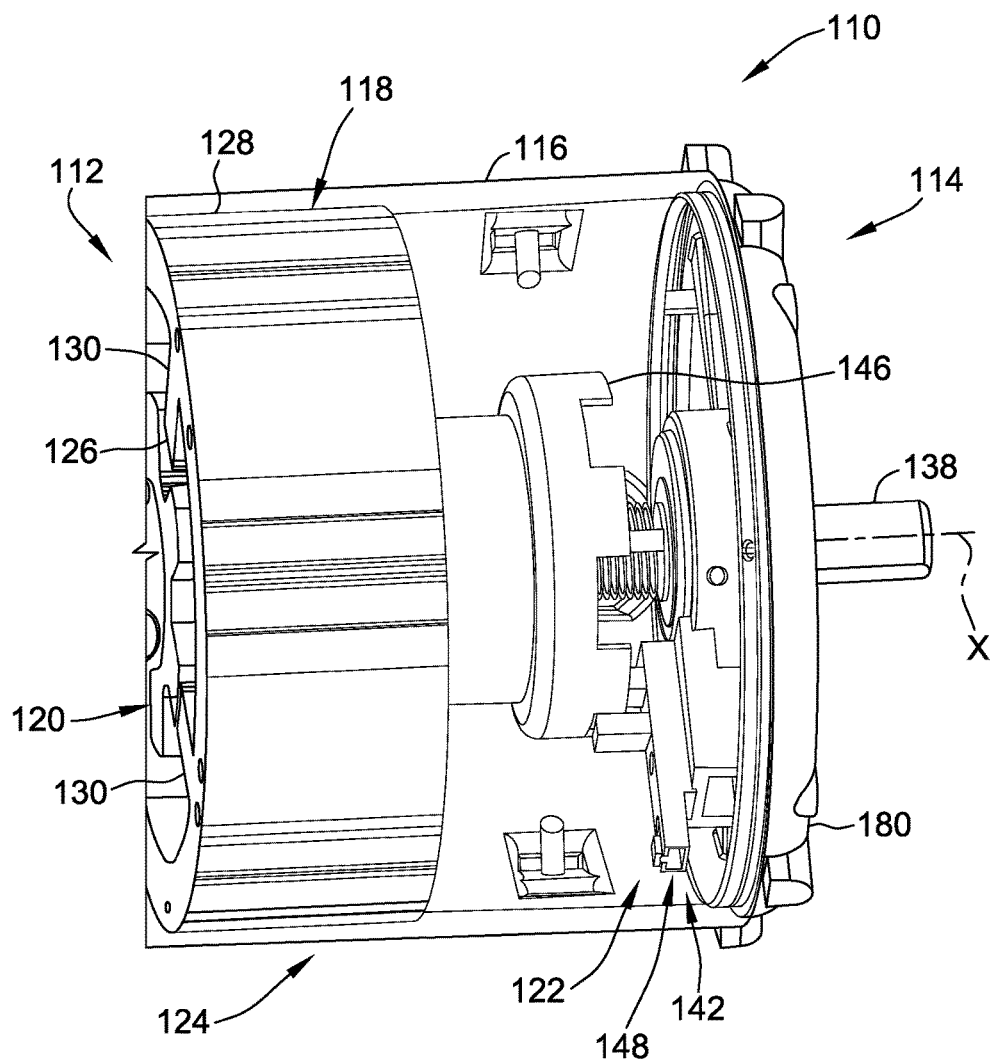
FIG. 6 is a perspective view of an alternative switched reluctance machine ("SRM")
Figure 7:
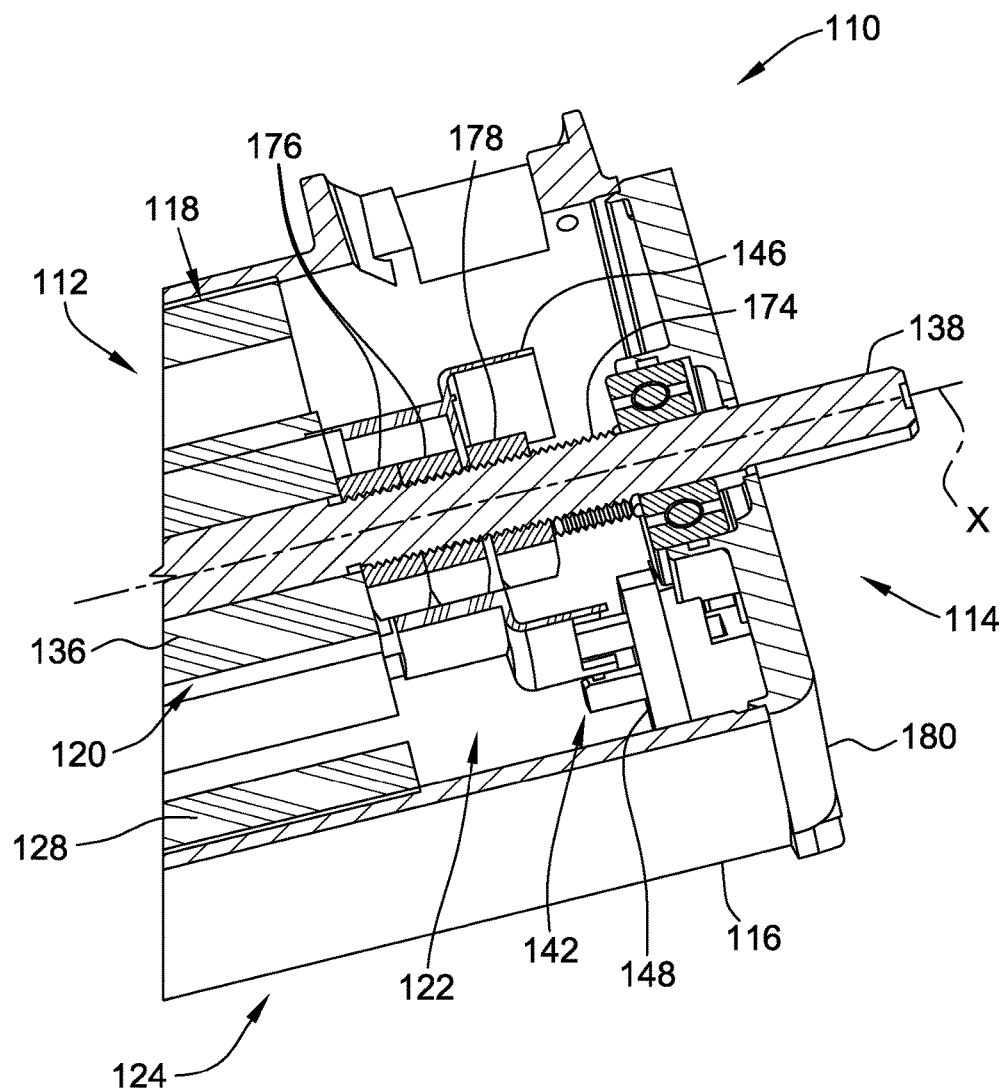
FIG. 7 is a perspective cut-away view of the SRM shown in FIG. 1.

FIG. 6 is a perspective view of an alternative electric machine 110. FIG. 7 is a perspective cut-away view of electric machine 110. In the exemplary embodiment, electric machine 110 is a switched reluctance motor, although, electric machine 110 may function as either a switched reluctance motor or a switched reluctance generator. Furthermore, electric machine 110 can be, without limitation, a permanent magnet AC motor, brushless DC (BLDC) motor, permanent magnet AC generator, and brushless dc generator (BLDCG). In the exemplary embodiment, electric machine 110 includes a first end 112, a second end 14, and a motor assembly housing 116 (shown transparent in FIG. 6). Electric machine 110 also includes a stator assembly generally indicated at 118, and a rotor assembly generally indicated at 120. Motor assembly housing 116 defines an interior space 122 and an exterior 124 of electric machine 110 and is configured to at least partially enclose and protect stator assembly 118 and rotor assembly 120. Stator assembly 118 includes a stator core 128 having a plurality of stator poles 130, and a plurality of windings 132 (not shown in FIG. 6). Each stator pole 130 includes a winding 132 wound around the pole. In the exemplary embodiment, stator poles 130 have an inner edge 126 having a width (arc length) substantially identical to inner edge 52 of stator poles 30 (shown in FIG. 2).

Figure 8:
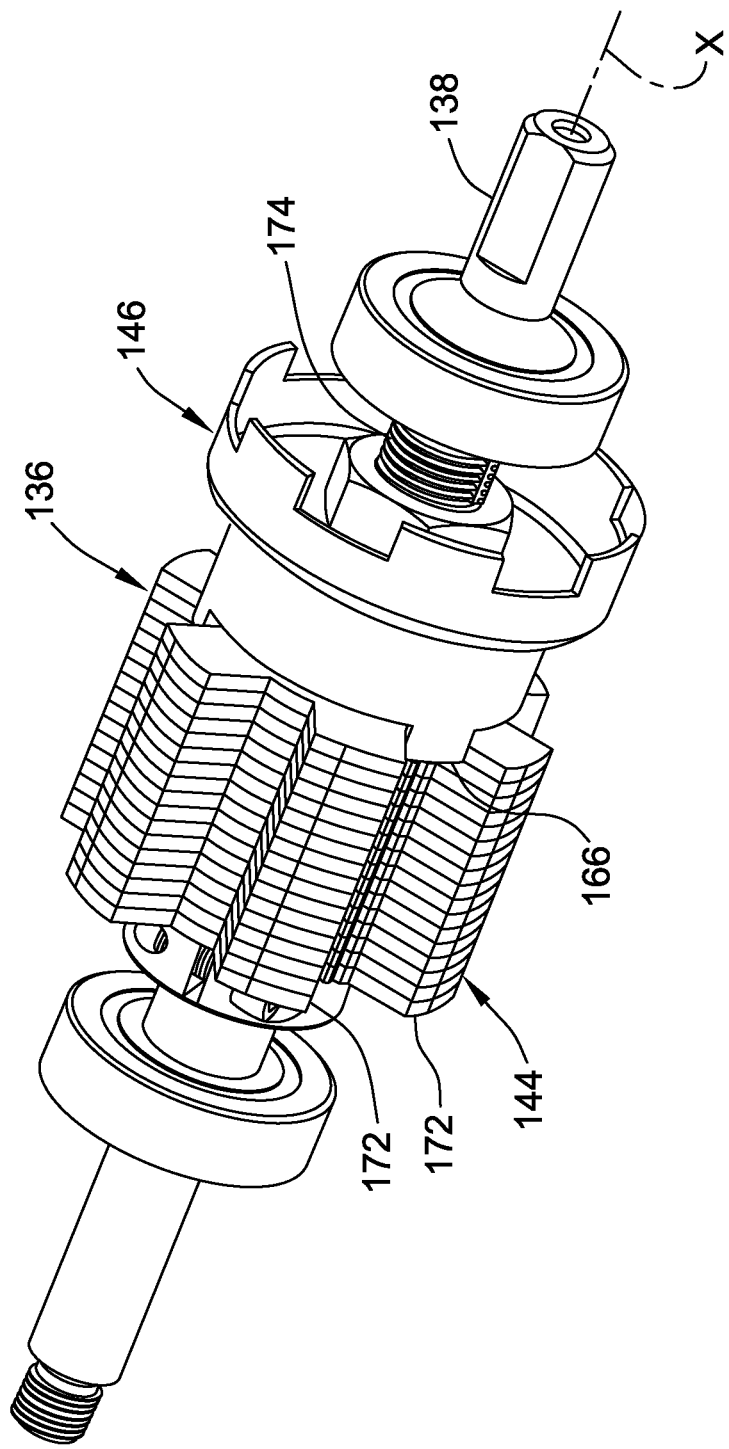
FIG. 8 is a perspective view of a rotor assembly for use with the SRM shown in FIG. 6.

FIG. 8 is a perspective view of rotor assembly 120 for use with electric machine 110 (shown in FIG. 6). In the exemplary embodiment, rotor assembly 120 includes a plurality of rotor poles 172 and is shown as a six pole rotor structure. Alternatively, rotor assembly 120 may include any number of rotor poles 172 that enables electric machine 110 to function as described herein, for example, without limitation, rotor assembly 120 may have eight or ten poles. Furthermore, rotor assembly 120 includes a rotor core 136 and a rotor shaft 138. In the exemplary embodiment, rotor core 136 is formed from a stack of rotor laminations 144 made of magnetically permeable material. Alternatively, rotor core 136 is a solid core. Rotor core 136 is substantially concentric with and configured to rotate about axis of rotation X. While FIGS. 6 and 7 are illustrations of a two phase SRM, the methods and apparatus described herein may be included within motors having any number of phases, including single phase and multiple phase motors.

In the exemplary embodiment, electric machine 110 includes an optical sensing system 142 including an encoder device 146 and an optical sensor 148. Optical sensor 148 is capable of both generating an optical signal (not shown) and sensing the generated optical signal. While optical sensing system 142 is described as including optical sensor 148 for receiving an optical signal, it should be noted that use of the term "optical" is not to be equated with the term "visible." Optical sensing system 142 as described herein is configured to sense a wide spectral range. Optical sensor 148 may be capable of generating and sensing radiation, or light, with wavelengths in the ultraviolet (about 200-400 nanometers (nm)), visible (about 400-700 nm), near-infrared (about 700-1200 nm), and infrared ranges (about 1200-10000 nm) of the electromagnetic spectrum.

Figure 9:
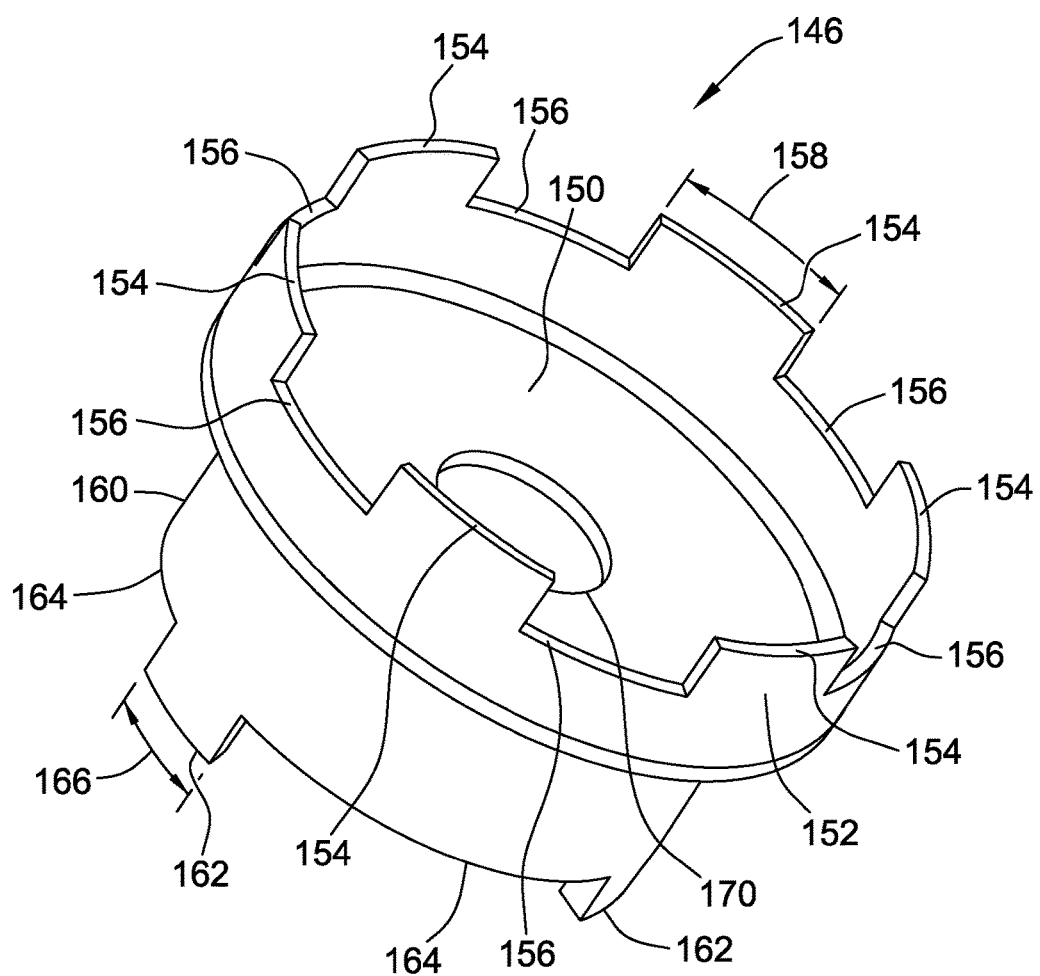
FIG. 9 is a perspective view of an encoder device for use with the rotor assembly shown in FIG. 8.

FIG. 9 is a perspective view of encoder device 146 for use with rotor assembly 120 (shown in FIG. 8). With reference to FIGS. 6-9, in the exemplary embodiment, encoder device 146 is a cup like structure including a substantially flat, disk-shaped central wall 150. Central wall 150 includes an annular flange 152 extending substantially perpendicular from the periphery of central wall 150. Flange 152 includes a plurality of encoder teeth 154 extending from an upper edge 156 of flange 152. In the exemplary embodiment, encoder device 146 includes six equispaced encoder teeth 154, each having a substantially equal width (or arc length) 158, i.e., each tooth 154 is substantially rectangular in shape. Width 158 is substantially equal to a width of inner edge 126 of stator poles 130. This enables encoder device 146 to have a one to one relationship with stator poles 130 of stator core 128, thereby enabling optical sensing system 142 to generate a synchronized signal of rotor assembly 120 position to the motor controller (not shown). In alternative embodiments, encoder device 146 may have more or fewer encoder teeth 154, such that the number corresponds to the number of rotor poles of electric machine 110.

In the exemplary embodiment, an annular wall 160 extends substantially perpendicular from central wall 150 in a direction opposite of flange 152. Annular wall 160 is radially offset inward from the periphery of central wall 150 a predetermined distance corresponding to a radial dimension of rotor core 136. Annular wall 160 includes a plurality of rotor teeth 162 extending from an upper edge 164 of annular wall 160. In the exemplary embodiment, encoder device 146 includes three equispaced rotor teeth 162, each having a width (or arc length) 166 configured to be substantially equal to a width defined between respective rotor poles 172. This enables encoder device 146 to have a very precise fit to rotor core 136. In the exemplary embodiment, rotor teeth 162 of annular wall 160 are aligned between a respective pair of encoder teeth 154 of flange 152 to enable accurate location information of rotor poles 172 to be sensed by optical sensing system 142, even during instances of rotor vibration. Alternatively, rotor teeth 162 of annular wall 160 are angularly offset to any rotational angle with respect to encoder teeth 154 of flange 152 such that electric machine 110 functions as described herein. For example, without limitation, encoder teeth 154 can be angularly offset with respect to rotor teeth 162 to enable an adjustment to phase turn-on/turn-off angle. In such an embodiment, encoder device 146 can trigger optical sensing system 142 to generate a signal at a time such that the rotor and stator poles are at a predetermined appropriate alignment for phase turn-on/turn-off.

Further, central wall 150 includes a concentric opening 170 configured to receive shaft 138 of rotor assembly 120. As seen in FIG. 7, shaft 138 includes a plurality of threads 174 extending away from rotor core 136 a predefined distance along shaft 138, beginning at a position proximate rotor core 136. In operation, encoder device 146 is coupled to rotor assembly 120 using a plurality of spacers 176 and a nut 178. Spacers 176 are placed over shaft 138 and positioned against rotor core 136. The number of spacers 176 required can vary; however, enough spacers are placed on shaft 138 to ensure that central wall 150 of encoder device 146 seats against spacers 176 while at least a portion of rotor teeth 162 extend between rotor poles 172. Nut 178 is then placed on shaft 138 and tightened against encoder device 146.

Figure 10:
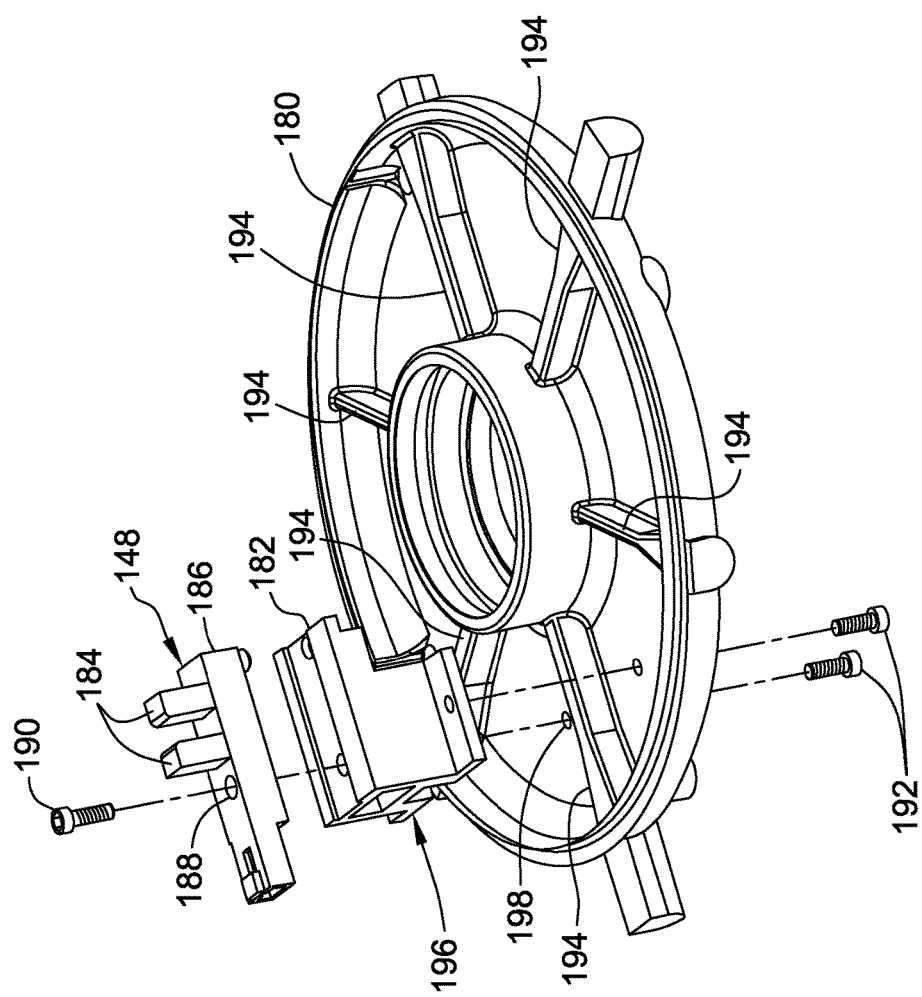
FIG. 10 is a perspective view of an end plate for use with the SRM shown in FIG. 6, illustrating a mounting configuration for an optical sensor.

FIG. 10 is a perspective view of an end plate 180 for use with electric machine 110 (shown in FIG. 6) illustrating a mounting configuration for optical sensor 148. In the exemplary embodiment, optical sensor 148 is an electronic radiation sensor configured to both generate an optical signal (not shown) and sense the generated optical signal. Optical sensor 148 includes a pair of parallel arms 184 extending away from a base 186. One of parallel arms 184 is configured to generate the optical signal and the other is configured to sense the generated optical signal. Base 186 has a hole 188 therethrough for receiving a fastener 190. In the exemplary embodiment, optical sensor 148 is releasably coupled to a sensor mount 182, for example, without limitation, using fastener 190. Alternatively, optical sensor 148 is coupled to mount 182 using any releasable fastening device that enables optical encoder 148 to function as described herein.

In the exemplary embodiment, mount 182 is coupled to end plate 180 using a pair of fasteners 192. Alternatively, mount 182 is coupled to end plate 180 using any releasable fastening device that enables mount 182 to function as described herein. As seen in FIG. 10, end plate 180 includes a plurality of radial ribs 194. Mount 182 includes a channel 196 formed therein. Channel 196 is configured to straddle a rib 194, which enables fixing mount 182 in place on end plate 180. Alternatively, channel 196 may be omitted from mount 182, and mount 182 is fastened to a portion of end plate 180.

In the exemplary embodiment, end plate 180 includes a pair of holes 198 formed on opposite sides of a rib 194. Mount 182 is placed over rib 194 such that channel 196 straddles rib 194. Fasteners 192 extend through holes 198 to releasably couple mount 182 to end plate 180. The position of mount 182 and optical sensor 148 is predetermined such that when end plate 180 is coupled to motor assembly housing 116, encoder teeth 154 of encoder device 146 pass between pair of parallel arms 184 of optical sensor 148.

In operation, optical sensor 148 generates an optical signal that is sensed by optical sensor 148. As electric machine 110 is rotated, encoder teeth 154 of encoder device 146 pass through and intermittently block the optical signal. The intermittent optical signal passing can be detected by the optical sensor 148, i.e., if the optical signal is detected, then the sensor slot is free from encoder teeth 154 and if the optical signal is not detected, the signal is being blocked by encoder teeth 154. Because the encoder teeth 154 correspond to the absolute position of rotors poles 172, optical sensor 148 generates a signal that is transmitted to the motor controller that is indicative of the absolute position of rotor assembly 120

The apparatus, systems, and methods described herein provide for determining the absolute rotor position of a switched reluctance machine ("SRM") having decreased motor size, cost, and complexity as compared to at least some known SRMs. One advantage to forming apertures in one or more of the stator core and the rotor core is that the SRM can be fabricated without the need for a separate rotor position sensor. This enables the SRM to be manufactured with a reduced size and complexity (fewer parts), thereby decreasing the manufacturing costs of the SRM. Another advantage is that by eliminating a separate sensor, the reliability of the SRM may be increased by eliminating an additional point of failure in the SRM. Furthermore, forming apertures in one or more of the stator core and the rotor core is advantageous in that the rotor position and the rotor rotation direction can be acquired at the same time with a single pass of a rotor pole by a stator pole.

Exemplary embodiments of the SRM are described above in detail. The SRM and its components are not limited to the specific embodiments described herein, but rather, components of the systems may be utilized independently and separately from other components described herein. For example, the components may also be used in combination with other machine systems, methods, and apparatuses, and are not limited to practice with only the systems and apparatus as described herein. Rather, the exemplary embodiments can be implemented and utilized in connection with many other applications.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the invention, including the best mode, and to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An electric machine comprising:
a stator assembly defining a longitudinal axis and comprising a substantially cylindrical stator core concentric with and extending longitudinally along the longitudinal axis, said stator core comprising a plurality of stator poles, each said stator pole comprising an inner surface spaced radially outward from the longitudinal axis, each said stator pole further comprising a first aperture extending radially outward from said inner surface of the respective stator pole, wherein each said first aperture is angularly offset from a radial line centered on the respective stator pole in a trailing edge direction of the respective stator pole and extends longitudinally along an entire length of said stator core, and wherein at least one said first aperture is in a position relative to the respective radial line on the respective stator pole that is the same as a position of another said first aperture relative to the respective radial line on the respective stator pole; and a rotor assembly rotatable about the longitudinal axis, said rotor assembly comprising a rotatable shaft and a rotor core concentric with and extending longitudinally along the longitudinal axis, said rotor core comprising a rotor pole comprising an outer surface spaced radially outward from the longitudinal axis, said outer surface spaced radially inward from said inner surfaces of said plurality of stator poles, wherein said rotor core rotates in a rotation direction during operation of said electric machine to generate a magnetic flux and define an inductance curve associated with the electric machine, wherein said rotor pole passes the radial line centered on the respective stator pole prior to passing said first aperture of the respective stator pole when said rotor core rotates in the rotation direction, and wherein the position of each said first aperture provides a detection signal during a negative slope portion of the inductance curve.

2. The electric machine in accordance with claim 1, wherein each said first aperture extends longitudinally along a portion of said stator core and substantially parallel to the longitudinal axis.

3. The electric machine in accordance with claim 2, wherein each said first aperture extends longitudinally along an entire length of said stator core.

4. The electric machine in accordance with claim 1, wherein each said first aperture has a cross-sectional profile shape comprising one or more of rectangular, curved, and polygonal.

5. The electric machine in accordance with claim 1, wherein said rotor pole further comprises a second aperture extending radially inward from said outer surface of said rotor pole.

6. The electric machine in accordance with claim 5, wherein said second aperture is angularly offset from a radial line centered on said rotor pole in a trailing edge direction of said rotor pole, wherein said second aperture passes the radial line of one stator pole of the plurality of stator poles prior to passing said first aperture of said one stator pole when said rotor core rotates in the rotation direction.

7. The electric machine in accordance with claim 5, wherein said second aperture extends longitudinally along a portion of said rotor core and substantially parallel to the longitudinal axis, said second aperture substantially opposite said first aperture.

8. The electric machine in accordance with claim 7, wherein said second aperture extends longitudinally along an entire length of said rotor core.

9. The electric machine in accordance with claim 5, wherein said second aperture defines a cross-sectional profile shape comprising one or more of rectangular, curved, and polygonal.

10. The electric machine in accordance with claim 1, wherein each said first aperture is circumferentially spaced from a leading edge of the respective stator pole in a trailing edge direction of the respective stator pole such that a positive slope portion of the inductance curve is generally smooth, the position of each said first aperture provides an irregularity proximate a maximum inductance point of the inductance curve.

* * * * *